(No Model.) 2 Sheets—Sheet 1.

C. VAN SMITH
CAR COUPLING.

No. 255,057. Patented Mar. 14, 1882.

WITNESSES
F. B. Townsend
Chas. E. Gaylord.

INVENTOR—
C. Van Smith
By G. B. Coupland &Co
att's

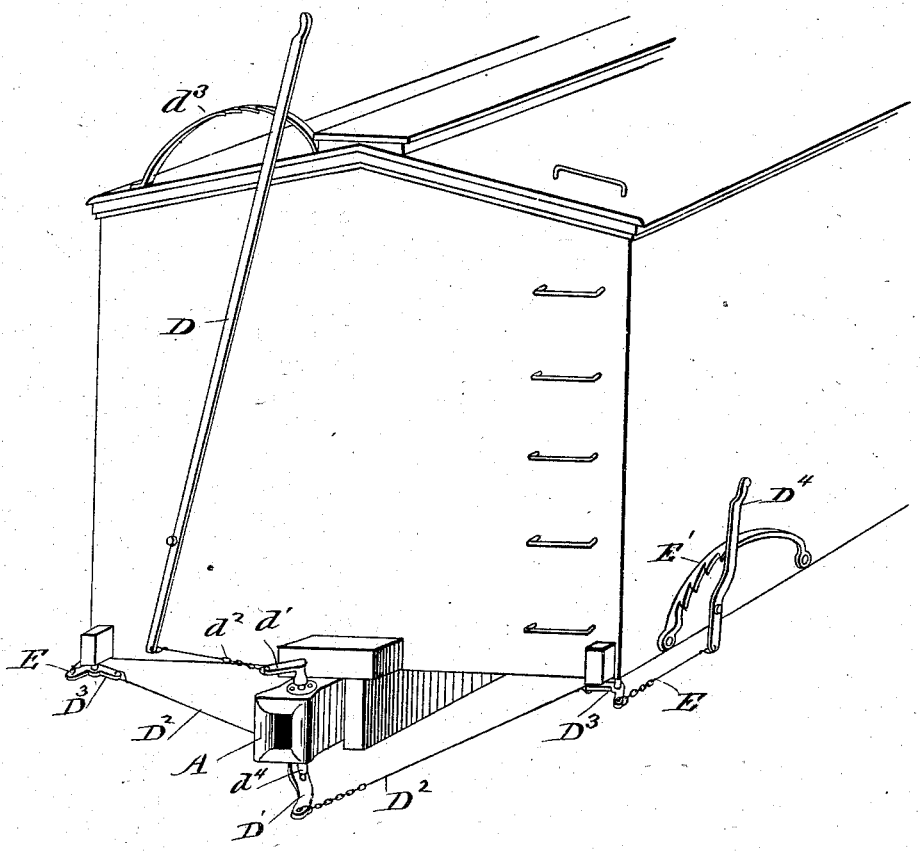

UNITED STATES PATENT OFFICE.

CHARLIE VAN SMITH, OF SOUTH BEND, INDIANA.

CAR-COUPLING.

SPECIFICATION forming part of Letters Patent No. 255,057, dated March 14, 1882.

Application filed December 22, 1881. (No model.)

*To all whom it may concern:*

Be it known that I, CHARLIE VAN SMITH, of South Bend, county of St. Joseph, and State of Indiana, have invented certain new and useful Improvements in Car-Couplings; and I do hereby declare the following to be a full, clear, and exact description thereof, that will enable others to make and use the same, reference being had to the accompanying drawings, and to letters of reference marked thereon, forming a part of this specification.

This invention relates to that class of couplings which are automatic or self-coupling, and is designed more especially to be used in connection with freight-cars, the construction, arrangement, and operation of which will be hereinafter more fully set forth in detail, and pointed out in the claims.

Figure 1 is a horizontal section of a draw-head broken away, showing the arrangement of the coupling mechanism. Fig. 2 is a vertical section of the same in the plane 2 2, Fig. 1; Fig. 3, an end view of the draw-head. Figs. 4 and 5 are modifications; and Fig. 6 is a partial side and end elevation of a box-car, showing the arrangement and application of the uncoupling mechanism.

Referring to the drawings, A represents the draw-head, which is so constructed as to provide the recess or compartment $a$ for the reception of the coupling. This recess is somewhat larger than the mouth A' of the draw-head, which permits the coupling-jaws B B' to spread apart, so as to engage with or disengage from the enlarged hook ends $a'$ of the arrow-headed coupling-bar B². The coupling-jaws are formed of a single piece and are bent around at the rear end, forming a spring-bow, which is retained in place by the draft-pin B³. The abutting-pin $a^2$ serves to prevent the coupling-iron from being forced back from the draft-pin B³.

On the sides of the coupling-jaws B B' are placed the springs $b\ b'$, one end of each being rigidly attached to the inner surface of the draw-head, while the opposite ends have frictional contact with the sides of the coupling-jaws, all as shown in Fig. 1 of the drawings. The springs serve to retain the jaws in close engagement with the coupling-bar, and also to prevent the jaws from spreading by the vibrations of the car. The semicircular stop-pin $a^3$ prevents the coupling-bar B² from entering the recessed draw-head beyond this point.

The elongated cams C C' are placed between the parts forming the coupling-jaws, and when rotated serve to spread the jaws and uncouple the cars. The cams C C' are secured in relation to each other by the dowel-pin P, which arrangement readily permits the rotation of either of the cams independently of the other. To the upper cam, C, is attached the stem $d$, projecting through the upper side of the draw-head, where it is provided with the crank-arm $d'$, as shown in Fig. 6 of the drawings. The chain or cord $d^2$ forms the connection between the crank-arm and the lower end of the operating-lever D, the upper end of this lever projecting above the top of the car for the purpose of allowing the car to be uncoupled from this point. The curved ratchet-bar $d^3$ serves to lock the lever D in the desired position. The lower cam, C', is provided with the stem $d^4$, projecting downward and through the under side of the draw-head, which is also provided with the double-crank arm D', to the perforated ends of which are attached the chains or cords D², connecting with the inner ends of the bell-cranks D³, located at each side of the car, the opposite projection of the bell-cranks being connected with the operating lever or levers D⁴, attached to the side of the car, close to the bottom, through the medium of the chain or cord E. By this arrangement the process of uncoupling the car may be accomplished from either side by a person standing on the ground, the ratchet bar or bars E' serving to hold the lever D⁴ at any desired point.

The coupling-bar B² is provided with the arrow-headed ends $a'$, the rounded surfaces of which conveniently enter the flaring mouth of the draw-head, spreads apart, and engages with the jaws B B'. The flaring rectangular mouth of the draw-head permits cars of varying heights to readily couple together. By the movement of either of the operating-levers the upper or lower cam, as the case may be, is rotated, so as to bring the longest part to bear against the inside of and spread apart the jaws, thus disengaging them from the arrow-headed coupling-bar, which has the effect of uncoupling the cars.

Figure 1:
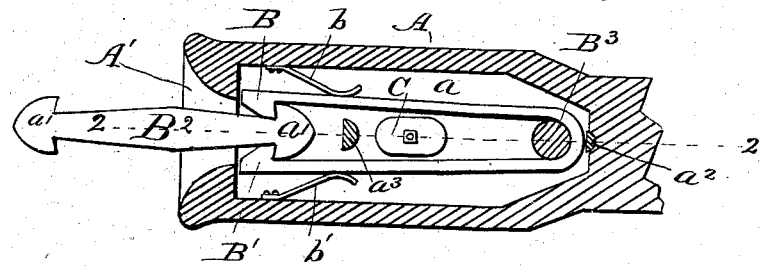
Figure 2:
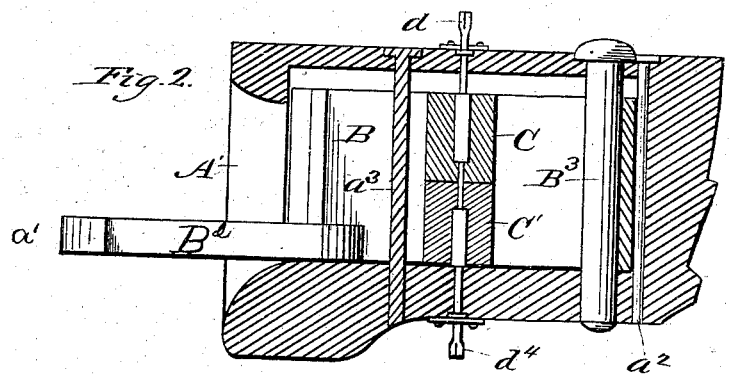
Figure 3:
Figure 4:
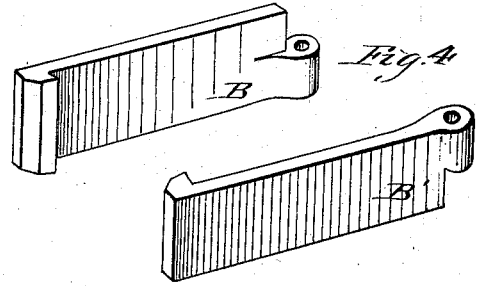
Fig. 4 is a modification showing how the jaw parts may be formed in two distinct halves and provided with perforated hinge-projections at the rear ends, through which the draft-pin may be inserted, uniting the parts together.
Figure 5:
Fig. 5 is a modification showing an arrow-head welded to the ordinary coupling-link, adapting the old and new styles to couple together.

Having thus described my invention, what I claim, and desire to secure by Letters Patent, is—

1. In an automatic coupling device, the combination, with the draw-head A, and the coupling-jaws B B', of the double elongated cams C C', whereby the process of uncoupling may be performed from the top of the car or from either side, substantially as described.

2. The combination, with the elongated cams C C', of the dowel-pin P, whereby the cams are retained in their proper position relative to each other, and each adapted to be rotated independently of the other, substantially as and for the purpose set forth.

CHARLIE VAN SMITH.

Witnesses:
 LU. M. FREEMAN,
 L. B. COUPLAND.